(12) United States Patent
Park et al.

(10) Patent No.: US 12,483,667 B2
(45) Date of Patent: Nov. 25, 2025

(54) ELECTRONIC DEVICE, METHOD, AND COMPUTER READABLE RECORDING MEDIUM FOR SYNCHRONIZING VIDEOS BASED ON MOVEMENT OF BODY

(71) Applicant: NCSOFT CORPORATION, Seongnam-si (KR)

(72) Inventors: Sungbum Park, Seongnam-si (KR); Yeonkun Lee, Seongnam-si (KR); Seongjong Ha, Seongnam-si (KR)

(73) Assignee: NCSOFT CORPORATION, Seongnam-si (KR)

( * ) Notice: Subject to any disclaimer, the term of this patent is extended or adjusted under 35 U.S.C. 154(b) by 40 days.

(21) Appl. No.: 18/185,719

(22) Filed: Mar. 17, 2023

(65) Prior Publication Data

US 2023/0300281 A1  Sep. 21, 2023

(30) Foreign Application Priority Data

Mar. 18, 2022 (KR) .......... 10-2022-0033962

(51) Int. Cl.
*H04N 5/04* (2006.01)
*G06T 7/246* (2017.01)
*G06V 10/74* (2022.01)
*G06V 40/20* (2022.01)

(52) U.S. Cl.
CPC .............. *H04N 5/04* (2013.01); *G06T 7/246* (2017.01); *G06V 10/761* (2022.01); *G06V 40/20* (2022.01); *G06T 2207/30196* (2013.01)

(58) Field of Classification Search
CPC ...... H04N 5/04; H04N 23/90; H04N 21/4307; H04N 21/8547; G06T 7/246; G06T 2207/30196; G06T 2207/20081; G06T 2207/20084; G06T 7/38; G06T 7/20; G06V 10/761; G06V 40/20; G06V 10/82; G06V 20/48; G06N 3/045; G06N 3/08
See application file for complete search history.

(56) References Cited

U.S. PATENT DOCUMENTS

| | | |
|---|---|---|
| 6,340,991 B1 | 1/2002 | Chen et al. |
| 11,955,145 B1* | 4/2024 | Kaufman ................ G06T 7/70 |
| 2010/0158354 A1* | 6/2010 | Kim .................... G06T 13/40 |
| | | 382/154 |
| 2016/0180883 A1* | 6/2016 | Hamer ................ G11B 27/031 |
| | | 386/201 |

(Continued)

FOREIGN PATENT DOCUMENTS

| | | | |
|---|---|---|---|
| CN | 112183184 A * | 1/2021 | ......... G06K 9/00335 |
| KR | 10-2308347 B1 | 10/2021 | |

*Primary Examiner* — Michael Lee
(74) *Attorney, Agent, or Firm* — Sughrue Mion, PLLC

(57) ABSTRACT

An electronic device according to an embodiment includes a memory for storing instructions, and at least one processor operatively coupled to the memory, wherein when the instructions are executed, the at least one processor is configured to identify a plurality of videos capturing a body from each of a plurality of cameras, obtain a first information indicating a movement of a designated body part from a first video of the plurality of videos, obtain a second information indicating a movement of the designated body part from a second video of the plurality of videos, and synchronize the first video and the second video based on the first information and the second information.

14 Claims, 8 Drawing Sheets

(56) References Cited

U.S. PATENT DOCUMENTS

| | | | | |
|---|---|---|---|---|
| 2016/0180884 | A1* | 6/2016 | Nowak | H04N 9/8205 |
| | | | | 386/201 |
| 2018/0091704 | A1* | 3/2018 | Koyama | H04N 5/93 |
| 2021/0374424 | A1* | 12/2021 | Bhatia | G06F 18/2155 |
| 2023/0087345 | A1* | 3/2023 | Faust | H04N 23/90 |
| | | | | 348/262 |
| 2023/0267621 | A1* | 8/2023 | Bao | G06T 7/292 |
| | | | | 382/106 |

* cited by examiner

ELECTRONIC DEVICE, METHOD, AND COMPUTER READABLE RECORDING MEDIUM FOR SYNCHRONIZING VIDEOS BASED ON MOVEMENT OF BODY

CROSS-REFERENCE TO RELATED APPLICATIONS

This application is based on and claims priority under 35 U.S.C 119 to Korean Patent Application No. 10-2022-0033962 filed on, Mar. 18, 2022, in the Korean Intellectual Property Office, the disclosures of which is incorporated by reference herein their entirety.

BACKGROUND

Field

Various embodiments relate to an electronic device, a method, and a computer readable recording medium for synchronizing videos based on a movement of a body.

Description of Related Art

Recently, interest in a technique for representing a posture of a body within a virtual two-dimensional space or a virtual three-dimensional space is increasing by capturing the body and interpreting the captured video through a neural network. The neural network may mean a model with the ability capable of solving a specific problem by adjusting the strength of synaptic coupling through learning about a node that has formed a network through the synaptic coupling. For example, the posture of the body may be reconstructed within a virtual space by obtaining a plurality of points corresponding to a body part through the neural network and connecting the obtained plurality of points to each other, based on the inputted image or video.

SUMMARY

An electronic device may reconstruct a posture of a body based on a plurality of videos obtained by a plurality of different cameras. For example, in case that the operating point of time of the plurality of cameras is different, a time difference may occur between the postures of the body captured in each of the plurality of videos. In case that the time difference occurs between the postures of the body, since the posture of the body is not able to be accurately reconstructed, the electronic device may need a method of synchronizing the plurality of videos. The method of synchronizing the plurality of videos may include a method using a time slate or a sensor, but the above methods are cumbersome and have a problem of increasing a constraint condition for capturing the video.

The electronic device, the method, and a computer readable recording medium according to various embodiments may provide the method of synchronizing videos based on a movement of the body.

The technical problems to be achieved in this document are not limited to those described above, and other technical problems not mentioned herein will be clearly understood by those having ordinary knowledge in the art to which the present disclosure belongs, from the following description.

An electronic device according to an embodiment may comprise a memory for storing instructions, and at least one processor operatively coupled to the memory, wherein when the instructions are executed, the at least one processor may be configured to identify a plurality of videos capturing a body from each of a plurality of cameras, obtain a first information indicating a movement of a designated body part from a first video of the plurality of videos, obtain a second information indicating a movement of the designated body part from a second video of the plurality of videos, and synchronize the first video and the second video based on the first information and the second information.

According to an embodiment, an operating method of an electronic device may comprise identifying a plurality of videos capturing a body from each of a plurality of cameras, obtaining a first information indicating a movement of a designated body part from a first video of the plurality of videos, obtaining a second information indicating a movement of the designated body part from a second video of the plurality of videos, and synchronizing the first video and the second video based on the first information and the second information.

According to an embodiment, a computer readable storage medium storing one or more programs, when executed by at least one processor of the electronic device, the one or more program may cause electronic device to identify a first video capturing a body in a first FoV (Field-of-View) and a second video capturing the body in a second FoV different from the first FoV, obtain an information for shifting at least one of the first video and the second video in a time domain, based on a movement of the body changing according to a designated axis included in the first FoV and the second FoV, and synchronize the first video and the second video based on the obtained information and store the first video and the second video in a memory of the electronic device.

Since an electronic device, a method, and a computer readable recording medium according to an embodiment can synchronize a plurality of videos based on a movement of a body, a videographer who captures body posture can easily synchronize the plurality of videos without preparing separate equipment.

The effects that can be obtained from the present disclosure are not limited to those described above, and any other effects not mentioned herein will be clearly understood by those having ordinary knowledge in the art to which the present disclosure belongs, from the following description.

BRIEF DESCRIPTION OF THE DRAWINGS

The above and/or other aspects of the disclosure will be more apparent by describing certain embodiments of the disclosure with reference to the accompanying drawings, in which.

DETAILED DESCRIPTION

Figure 1:
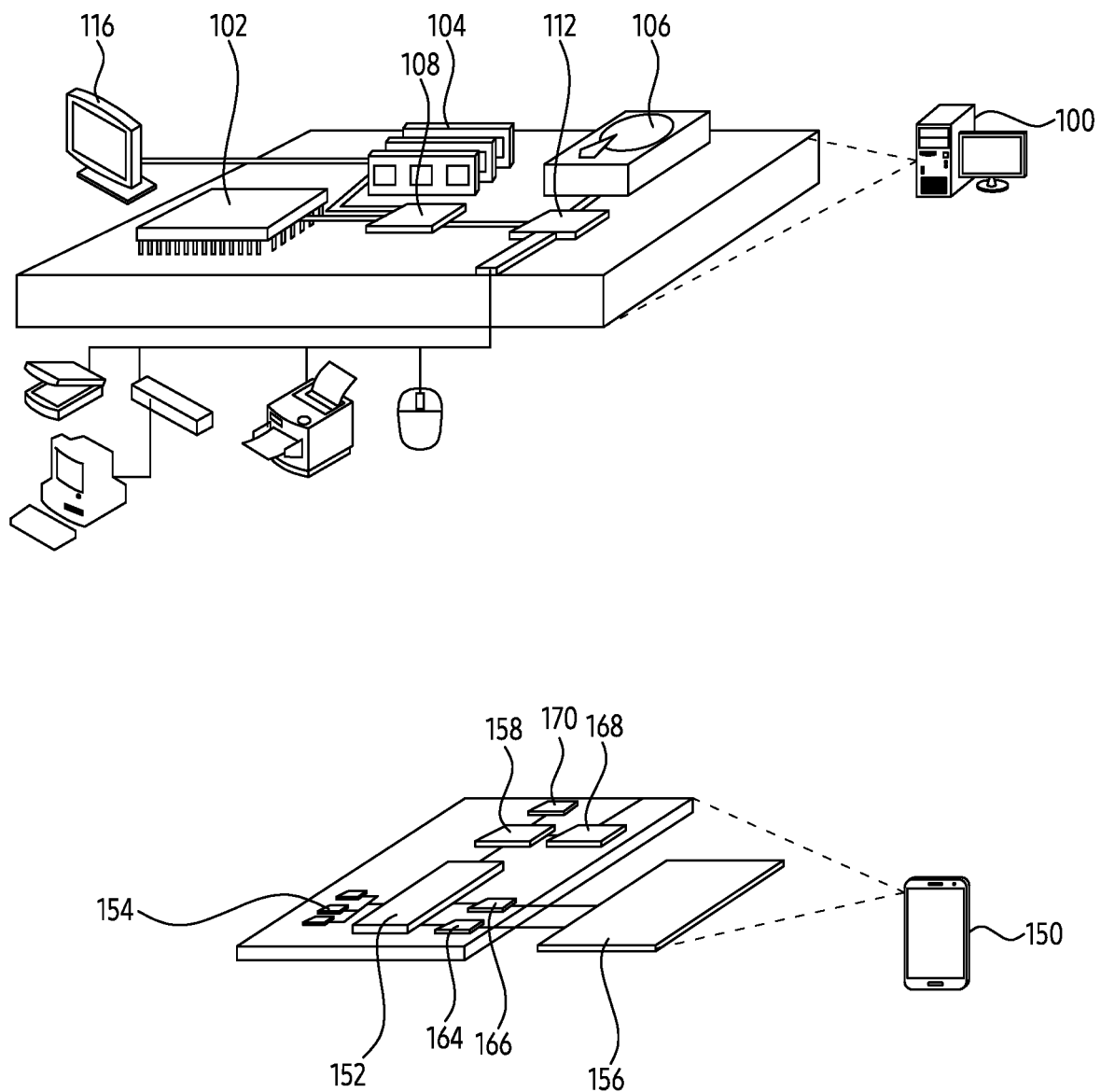
FIG. 1 is a simplified block diagram illustrating a functional configuration of an electronic device according to an embodiment.

FIG. 1 is a simplified block diagram illustrating a functional configuration of an electronic device according to an embodiment.

Referring to FIG. 1, an electronic device 100 according to an embodiment may include a processor 102, a memory 104, a storage device 106, a high-speed controller 108 (e.g., northbridge, MCH (main controller hub)), a low-speed controller 112 (e.g., southbridge, ICH (I/O (input/output) controller hub)). Within the electronic device 100, each of the processor 102, the memory 104, the storage device 106, the high-speed controller 108, and the low-speed controller 112 may be interconnected by using various buses. For example, the processor 102 may process instructions for execution within the electronic device 100 to display graphic information for a GUI (graphical user interface) on an external input/output device such as a display 116 connected to the high-speed controller 108. The instructions may be included in the memory 104 or the storage device 106. The instructions, when executed by the processor 102, may cause the electronic device 100 to perform one or more operations described above and/or one or more operations to be described below. According to embodiments, the processor 102 may be configured with a plurality of processors including a communications processor and a GPU (graphical processing unit).

For example, the memory 104 may store information in the electronic device 100. For example, the memory 104 may be a volatile memory unit or units. For another example, the memory 104 may be a non-volatile memory unit or units. For still another example, the memory 104 may be another type of computer-readable medium, such as a magnetic or optical disk.

For example, the storage device 106 may provide the electronic device 100 with a mass storage space. For example, the storage device 106 may be a computer-readable medium, such as a hard disk device, an optical disk device, a flash memory, a solid-state memory device, or an array of devices in a SAN (storage area network).

For example, the high-speed controller 108 may manage bandwidth-intensive operations for the electronic device 100, while the low-speed controller 112 may manage low bandwidth-intensive operations for the electronic device 100. For example, the high-speed controller 108 may be coupled with the memory 104 and may be coupled with the display 116 through the GPU or accelerator, while the low-speed controller 112 may be coupled with the storage device 106 and may be coupled with various communication ports (e.g., USB (universal serial bus), Bluetooth, ethernet, wireless ethernet) for communication with an external electronic device (e.g., a keyboard, a transducer, a scanner), or a network device (e.g., a switch or a router).

According to an embodiment, an electronic device 150 may be another example of the electronic device 100. The electronic device 150 may include an input/output device such as a processor 152, a memory 154, a display 156 (e.g., an OLED (organic light emitting diode) display or another suitable display), a communication interface 158, and a transceiver 162. Each of the processor 152, the memory 154, the input/output device, the communication interface 158, and the transceiver 162 may be interconnected by using various buses.

For example, the processor 152 may process instructions included in the memory 154 to display graphical information for the GUI on the input/output device. The instructions, when executed by the processor 152, may cause the electronic device 150 to perform one or more operations described above and/or one or more operations to be described below. For example, the processor 152 may interact with a user through a display interface 164 and a control interface 166 coupled to the display 156. For example, the display interface 164 may include a circuit for driving the display 156 to provide visual information to the user, and the control interface 166 may include a circuit for receiving commands received from the user and converting the commands to provide them to the processor 152. According to embodiments, the processor 152 may be implemented as a chipset of chips including analog and digital processors.

For example, the memory 154 may store information in the electronic device 150. For example, the memory 154 may include at least one of one or more volatile memory units, one or more non-volatile memory units, or the computer-readable medium.

For example, the communication interface 158 may perform wireless communication between the electronic device 150 and the external electronic device through various communication techniques such as a cellular communication technique, a Wi-Fi communication technique, an NFC technique, or a Bluetooth communication technique, based on the interworking with the processor 152. For example, the communication interface 158 may be coupled to the transceiver 168 to perform the wireless communication. For example, the communication interface 158 may be further coupled with a GNSS (global navigation satellite system) reception module 170 to obtain position information of the electronic device 150.

Figure 2:
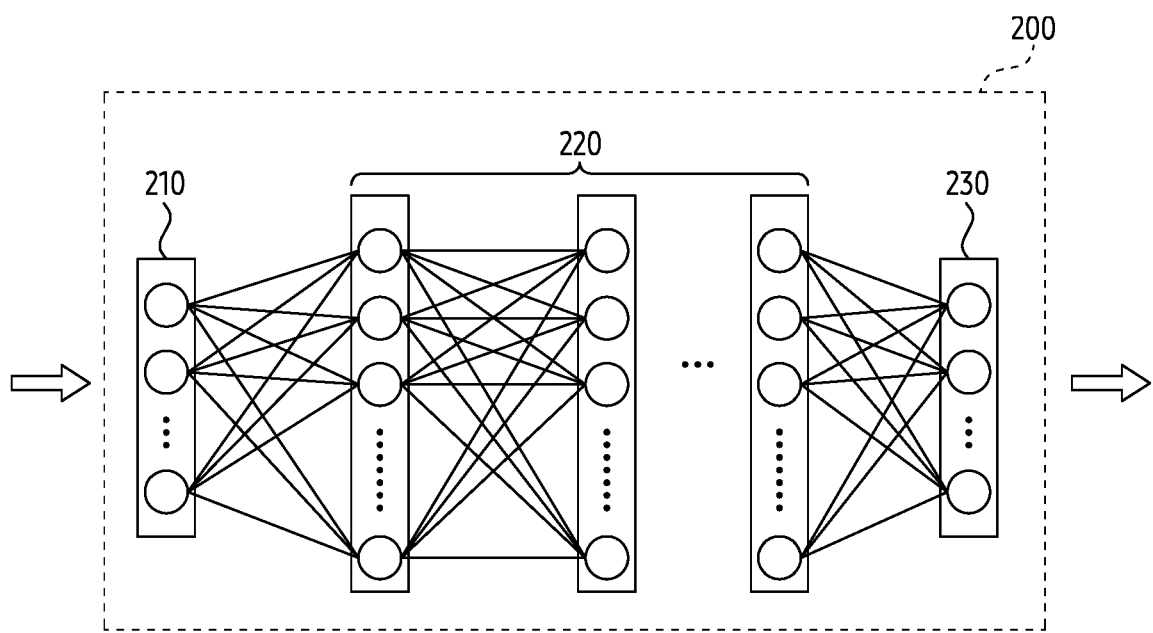
FIG. 2 is an exemplary diagram for describing a neural network obtained by an electronic device according to an embodiment from a set of parameters stored in a memory.

FIG. 2 is an exemplary diagram for describing a neural network obtained by an electronic device according to an embodiment from a set of parameters stored in a memory.

Referring to FIG. 2, the set of parameters related to a neural network 200 may be stored in a memory (e.g., a memory 104 of FIG. 1) of an electronic device (e.g., an electronic device 100 of FIG. 1) according to an embodiment. The neural network 200 is a recognition model implemented with software or hardware that mimics the computational power of a biological system by using a large number of artificial neurons (or nodes). The neural network 200 may perform a human cognitive action or a learning process through artificial neurons. The parameters related to the neural network 200 may indicate, for example, weights assigned to a plurality of nodes included in the neural network 200 and/or connections between the plurality of nodes. The number of the neural networks 200 stored in the memory 104 is not limited as illustrated in FIG. 2, and the set of parameters corresponding to each of a plurality of neural networks may be stored in the memory 104.

The model trained by the electronic device 100 according to an embodiment may be implemented based on the neural network 200 indicated based on the set of a plurality of parameters stored in the memory 104. The neurons of the neural network 200 corresponding to the model may be classified along a plurality of layers. The neurons may be indicated by a connection line connecting between a specific node included in a specific layer and another node included in a different another layer from the specific layer, and/or a weight assigned to the connection line. For example, the neural network 200 may include an input layer 210, hidden layers 220, and an output layer 230. The number of the hidden layers 220 may vary according to an embodiment.

The input layer 210 may receive a vector indicating input data (e.g., a vector having elements corresponding to the number of nodes included in the input layer 210). Based on the input data, signals generated at each of the nodes in the input layer 210 may be transmitted from the input layer 210 to the hidden layers 220. The output layer 230 may generate output data of the neural network 200 based on one or more signals received from the hidden layers 220. The output data may include, for example, the vector having elements mapped to each of the nodes included in the output layer 230.

The hidden layers 220 may be positioned between the input layer 210 and the output layer 230 and may change the input data transmitted through the input layer 210. For example, as the input data received through the input layer 210 propagates sequentially from the input layer 210 along the hidden layers 220, the input data may be gradually changed based on the weight connecting nodes of different layers.

As described above, each of the layers (e.g., the input layer 210, the hidden layers 220, and the output layer 230) included in the neural network 200 may include the plurality of nodes. The hidden layers 220 may be a convolution filter or a fully connected layer in a CNN (convolutional neural network), or may be a various type of a filter or a layer bound based on a special function or feature.

A structure in which the nodes are connected between the different layers is not limited to an example of FIG. 2. In an embodiment, the one or more hidden layers 220 may be a layer based on a recurrent neural network (RNN) in which an output value is re-entered to the hidden layer of the current time. In an embodiment, based on a LSTM (Long Short-Term Memory), the neural network 200 may further include one or more gates (and/or filters) for discarding at least one of the values of nodes, maintaining them for a relatively long period of time, or maintaining them for a relatively short period of time. The neural network 200 according to an embodiment may include the numerous hidden layers 220 to form a deep neural network. Training the deep neural network is called deep learning. The node included in the hidden layers 220 may be referred to as a hidden node.

The nodes included in the input layer 210 and the hidden layers 220 may be connected to each other through a connection line having the weights, and the nodes included in the hidden layers 220 and the output layer 230 may also be connected to each other through the connection line having the weights. Tuning and/or training the neural network 200 may mean changing the weights between the nodes included in each of the layers (e.g., the input layer 210, the hidden layers 220, and/or the output layer 230) included in the neural network 200. The tuning of the neural network 200 may be performed, for example, based on supervised learning and/or unsupervised learning.

The electronic device 100 according to an embodiment may train a model 240 based on the supervised learning. The supervised learning may mean training the neural network 200 by using a set of paired input data and output data. For example, the neural network 200 may be tuned to reduce the difference between the output data output from the output layer 230 and the output data included in the set while receiving the input data included in the set. As the number of sets increases, the neural network 200 may generate the output data generalized by the one or more sets with respect to other input data distinct from the set.

The electronic device 100 according to an embodiment may tune the neural network 200 based on reinforcement learning in the unsupervised learning. For example, the electronic device 100 may change policy information used by the neural network 200 to control an agent based on interaction between the agent and an environment. The electronic device 100 according to an embodiment may cause the change in the policy information by the neural network 200 to maximize the target and/or compensation of the agent by the interaction.

Figure 3:
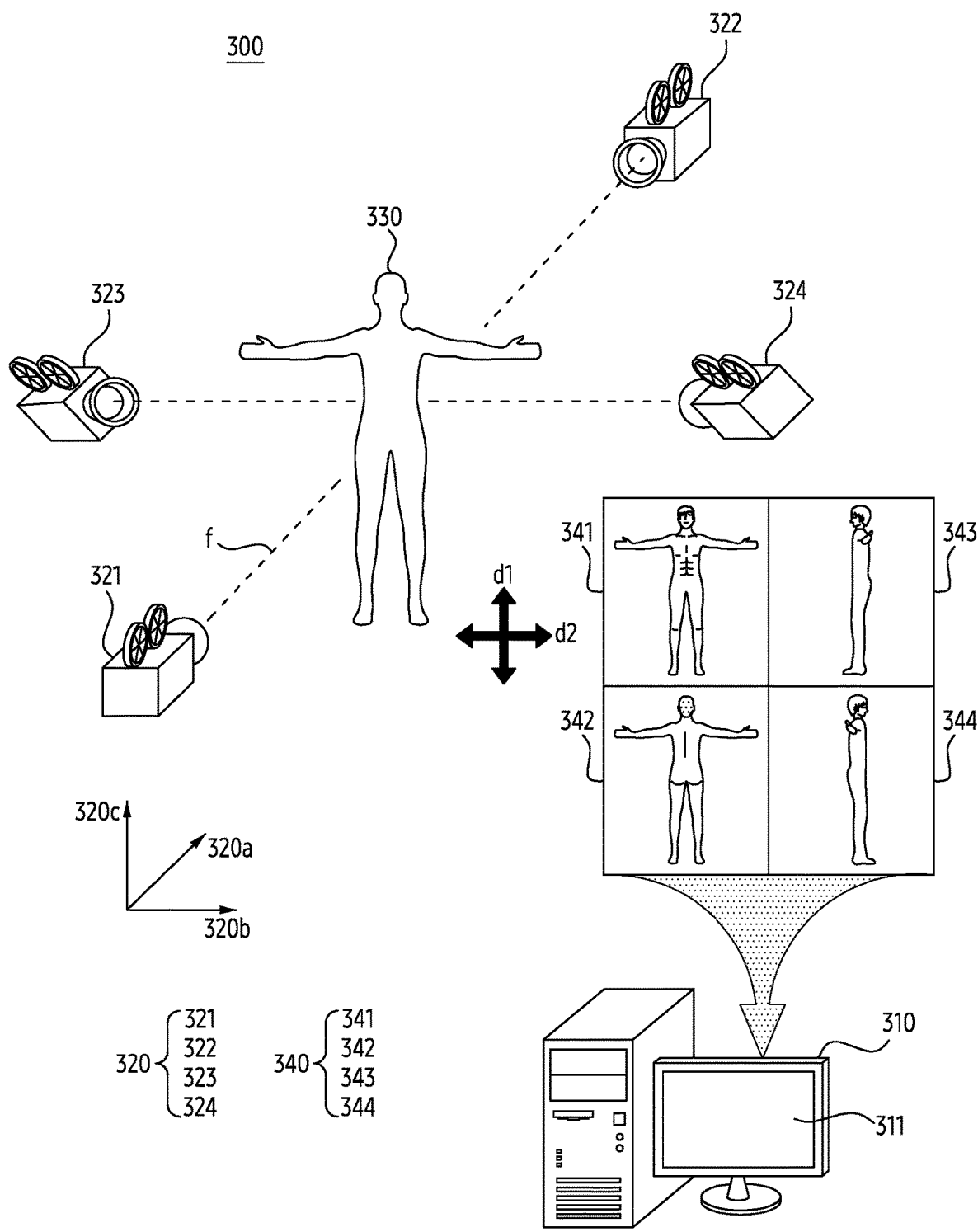
FIG. 3 illustrates an example of an environment including an electronic device according to an embodiment.

FIG. 3 illustrates an example of an environment including an electronic device according to an embodiment.

Referring to FIG. 3, an environment 300 according to an embodiment may include an electronic device 310 and one or more cameras 320. Since the electronic device 310 of FIG. 3 may be substantially the same as an electronic device 100 and/or an electronic device 150 of FIG. 1, an overlapping description will be omitted.

According to an embodiment, the electronic device 310 may be a terminal or a server owned by a user. For example, the electronic device 310 may include at least one of a personal computer (PC) such as a laptop and a desktop, a smartphone, a smartpad, and a tablet PC (Personal Computer).

According to an embodiment, the electronic device 310 may include a memory for storing instructions, at least one processor, and a display 311. The memory of the electronic device 310 may be substantially the same as a memory 104 or a memory 154 of FIG. 1, at least one processor of the electronic device 310 may be substantially the same as a processor 102 or a processor 152 of FIG. 1, and the display 311 of the electronic device 310 may be substantially the same as a display 116 or a display 156 of FIG. 1, so an overlapping description will be omitted.

The one or more cameras 320 may be used to capture a body 330. The camera 320 may be, for example, at least one of a digital camera, an action camera, and a gimbal camera, for capturing the body 330, but is not limited thereto. In FIG. 3, the camera 320 and the electronic device 310 are illustrated as separate devices, but this is for convenience of description. According to embodiments, the camera 320 may be a partial component of the electronic device 310 included in the electronic device 310.

According to an embodiment, the camera 320 may move relatively with respect to the body 330. For example, the camera 320 may rotate with respect to the body 330. The camera 320 may rotate based on at least one of a roll axis 320a, a pitch axis 320b, and a yaw axis 320c of the camera 320. The roll axis 320a of the camera 320 may mean a virtual line extending along a direction parallel to an optical axis f of the camera 320. The roll axis 320a of the camera 320 may extend along the front or rear of the camera 320. The pitch axis 320b of the camera 320 may mean the virtual line extending along a direction perpendicular to the roll axis 320a of the camera 320. For example, the pitch axis 320b of the camera 320 may extend along the left side or the right side of the camera 320 based on the camera 320. The yaw axis 320c of the camera 320 may mean the virtual line extending along a direction perpendicular to both the roll axis 320a of the camera 320 and the pitch axis 320b of the camera 320. For example, the yaw axis 320c of the camera 320 may extend along upward or downward of the camera 320 based on the camera 320. In case that the camera 320 is disposed on a ground, the yaw axis 320c of the camera 320 may be perpendicular with respect to the ground. According to an embodiment, the camera 320 may move linearly with respect to the body 330. For example, the camera 320 may move in a direction away from the body 330 or in a direction becoming closer to the body 330 along at least one of the roll axis 320*a*, the pitch axis 320*b*, and the yaw axis 320*c* of the camera 320.

According to an embodiment, the body 330 may take a specific posture while being captured by the camera 320. For example, the body 330 may move while taking the specific posture for a designated period of time. The camera 320 may obtain a one or more frames (or a one or more images) by capturing the body 330 taking the specific posture. For example, the one or more frames (or the one or more images) may include an image obtained by capturing the body 330 taking the specific posture. The image may be referred to as a still image. For another example, the one or more frames (or a one or more images) may include a video 340 obtained by capturing the body 330 taking the specific posture for the designated period of time.

According to an embodiment, the camera 320 may include a plurality of cameras 320 that capture the body 330 based on a different Field-of-View (FoV). The FoV may mean a range that may be captured by the camera 320 for the designated period of time, and the corresponding expression may be used equally below unless otherwise noted. According to an embodiment, the plurality of cameras 320 may obtain a plurality of videos 340 by capturing different parts of the body 330 based on a different FoV. According to an embodiment, the plurality of cameras 320 may orient the body 330 in an angle different from each other. For example, the camera 320 may include a first camera 321, a second camera 322, a third camera 323, and a fourth camera 324 that capture, respectively, different parts of the body 330 by orienting the body 330 in the angle different from each other. For example, the first camera 321 may capture the front surface of the body 330 by orienting the front surface of the body 330, the second camera 322 may capture the rear surface of the body 330 by orienting the rear surface of the body 330, the third camera 323 may capture the right side surface of the body 330 by orienting the right side surface of the body 330, and the fourth camera 324 may capture the left side surface of the body 330 by orienting the left side surface of the body 330. However, it is not limited thereto, and the disposition relationship of the plurality of cameras 320 may be variously changed. According to an embodiment, each of the yaw axes 320*c* of the plurality of cameras 320 may face substantially the same direction as each other. For example, the yaw axes 320*c* of each of the first camera 321, the second camera 322, the third camera 323, and the fourth camera 324 may face substantially the same direction as each other. Although FIG. 1 illustrates that the number of the plurality of cameras 320 is four, this is for convenience of description. The number of the camera 320 for capturing the body 330 is not limited by that illustrates in FIG. 1.

According to an embodiment, the camera 320 may transmit the obtained video 340 to the electronic device 310 based on obtaining the video 340. The video 340 may capture the body 330 moving for the designated period of time while taking the specific posture. For example, the camera 320 may capture a movement of the body 330 moving for the designated period of time to a first axis d1 parallel to the yaw axis 320*c* of the camera 320. For another example, the camera 320 may capture the movement of the body 330 moving for the designated period of time to a second axis d2 distinct from the yaw axis 320*c* of the camera 320. The second axis d2 may be, for example, parallel to the roll axis 320*a* of the camera 320 or parallel to the pitch axis 320*b*, but is not limited thereto.

According to an embodiment, the video 340 may include a first video 341 capturing the body 330 in the first FoV, a second video 342 capturing the body 330 in the second FoV, a third video 343 capturing the body 330 in the third FoV, and a fourth video 344 capturing the body 330 in the fourth FoV. For example, the first video 341 may be obtained by the first camera 321, the second video 342 may be obtained by the second camera 322, the third video 343 may be obtained by the third camera 323, and the fourth video 344 may be obtained by the fourth camera 324. In case that the yaw axes 320*c* of each of the first camera 321, the second camera 322, the third camera 323, and the fourth camera 324 face each other in substantially the same direction, the first video 341, the second video 342, the third video 343, and the fourth video 344 may share a designated axis in each FoV.

According to an embodiment, the processor of the electronic device 310 may identify the plurality of videos 340 capturing the body 330 from each of the plurality of cameras 320. The processor may obtain information indicating a movement of a designated body part from each of the plurality of videos 340. For example, the information may include first information, second information, third information, and fourth information corresponding to each of the first video 341, the second video 342, the third video 343, and the fourth video 344. The designated body part may be, for example, a hip joint of the body 330, but is not limited thereto. According to an embodiment, the processor may identify at least one points corresponding to the designated body part within each of the plurality of videos 340, based on a first model receiving each of the plurality of videos 340. The processor may obtain information indicating the movement of the designated body part within each of the plurality of videos 340, based on identifying the at least one points. According to an embodiment, the first model may include a neural network (e.g., a neural network 200 of FIG. 2) pre-learned to identify the designated body part of the body 330 in the video 340. For example, the first model may include a convolution neural network, but is not limited thereto.

According to an embodiment, each of the information indicating the movement of the body may include data on a position change over time of the designated body part in the video 340. For example, the first information, the second information, the third information, and the fourth information may each include the data on the position change over time of the designated body part in the first video 341, the second video 342, the third video 343, and the fourth video 344.

According to an embodiment, the processor of the electronic device 310 may synchronize the plurality of videos 340 based on the information obtained from each of the plurality of videos 340. For example, the processor may synchronize the first video 341 and the second video 342 based on the first information and the second information. For example, the processor may identify a first offset that minimizes the difference between the movement of the designated body part in the first video 341 and the movement of the designated body part in the second video 342, among offsets for shifting the second video 342 in a time domain of the second video 342. The processor may synchronize the first video 341 and the second video 342 based on identifying the first offset.

According to an embodiment, the processor of the electronic device 310 may obtain posture information for indicating the posture of the body 330 from the plurality of videos 340 based on synchronizing the plurality of videos 340. The posture information may include information for indicating the posture of the body 330 within a virtual space. For example, the posture information may represent the posture of the body 330 based on a skeleton model, but is not limited thereto. According to an embodiment, the processor may obtain data including a plurality of coordinates for representing different parts of the body 330 within each of the plurality of videos 340. The processor may obtain the posture information for indicating the posture of the body 330 by aggregating data including the plurality of coordinates obtained within each of the plurality of videos 340. For example, the processor may obtain the posture information based on a second model (e.g., the neural network 200 of FIG. 2) receiving data including the plurality of coordinates.

As described above, the electronic device 310 according to an embodiment may easily synchronize the plurality of videos 340 based on the movement of the body 330. For example, in case that the plurality of videos 340 are obtained by the plurality of cameras 320, the time difference may occur between the plurality of videos 340 due to different capturing start point of time of the plurality of cameras 320. The time difference between the plurality of videos 340 may occur, for example, when an operation signal from the electronic device 310 to each of the plurality of cameras 320 reaches at different point of time. As the time difference occurs between the plurality of videos 340, when the posture of the body 330 is reconstructed without synchronizing the plurality of videos 340, the accuracy of the posture of the reconstructed body 330 may be low. In case that a time slate is used to synchronize the plurality of videos 340, there may be an inconvenience that the user has to synchronize the plurality of videos 340 directly based on the audio corresponding to the sound of the time slate. As another method for synchronizing the plurality of videos 340, a sensor may be used, but a problem that the amount of calculation of the electronic device 310 for synchronizing the plurality of videos 340 is increased may occur, and there may be inconvenience for a videographer to prepare a sensor separately. According to an embodiment, since the electronic device 310 may synchronize the plurality of videos 340 based on identifying the movement of the designated body part from each of the plurality of videos 340, it may accurately reconstruct the posture of the body 330 even without a separate equipment.

Figure 4:
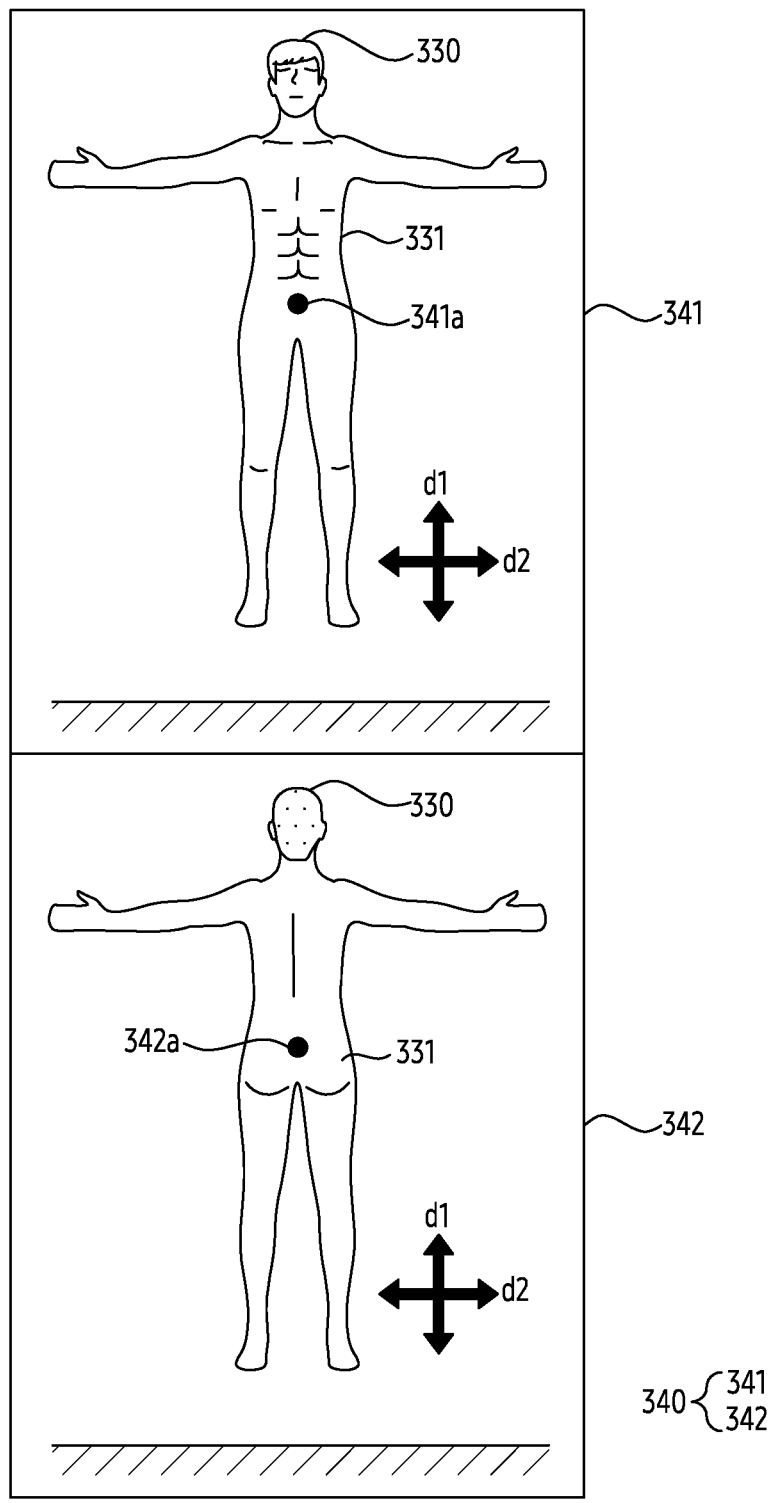
FIG. 4 illustrates an example in which an electronic device according to an embodiment identifies a movement of a designated body part in a plurality of videos.

FIG. 4 illustrates an example in which an electronic device according to an embodiment identifies a movement of a designated body part in a plurality of videos.

Hereinafter, for convenience of explanation, a method of operating the electronic device (e.g., an electronic device 310 of FIG. 3) according to an embodiment will be described based on a first video 341 and a second video 342, but the method of operating the electronic device 310 according to an embodiment may be substantially equally applied to a third video 343 and a fourth video 344 of FIG. 3.

Referring to FIG. 4, according to an embodiment, a processor of the electronic device (e.g., the electronic device 310 of FIG. 3) may identify at least one points corresponding to the designated body part in each of a plurality of videos 340 based on a first model receiving each of the plurality of videos 340. For example, the processor may identify a first point 341a corresponding to a designated body part 331 within the first video 341, based on the first model receiving the first video 341. For another example, the processor may identify a second point 342a corresponding to the designated body part 331 within the second video 342 based on the first model receiving the second video 342.

According to an embodiment, the processor of the electronic device 310 may obtain information indicating a movement of the designated body part 331 based on identifying the at least one points. For example, the processor may obtain first information indicating a position change of the first point 341a over time, based on identifying a movement of the first point 341a. For another example, the processor may obtain second information indicating a position change of the second point 342a over time, based on identifying a movement of the second point 342a.

According to an embodiment, the movement of the designated body part 331 may include moving the designated body part 331 along a direction different from yaw axes (e.g., a yaw axis 320c of FIG. 3) of each of a plurality of camera (e.g., a camera 320 of FIG. 3). For example, the designated body part 331 may move along a second axis d2 perpendicular to a first axis d1 parallel to the yaw axis 320c of the camera 320. In case that the designated body part 331 moves in a direction distinct from the first axis d1, video distortion may occur between the first video 341 and the second video 342. For example, in case that a body 330 moves along the second axis d2, although the body 330 performs one motion, the movement of the designated body part 331 of the body 330 in the first video 341 and the movement of the designated body part 331 of the body 330 in the second video 342 may be different each other. For example, in case that the designated body part 331 in the first video 341 moves to the right, the designated body part 331 in the second video 342 may move to the left. According to an embodiment, the processor may correct the video distortion between the first video 341 and the second video 342 based on first data. For example, the processor may obtain the first information and the second information indicating the movement of the body part 331 moving in a direction different from the first axis d1, based on the first data indicating a position relationship between a plurality of cameras 320. The first data may be an extrinsic parameter of the plurality of cameras 320 including at least one of a position, a rotation angle, a focal distance, or a distortion rate of the plurality of cameras 320. The extrinsic parameter may be referred to as an extrinsic matrix.

According to an embodiment, the movement of the designated body part 331 may include that the designated body part 331 moves in a direction parallel to the yaw axes 320c of each of the plurality of cameras 320. For example, the body 330 may move along the first axis d1 parallel to the yaw axis 320c of the camera 320. In case that the body 330 moves along the first axis d1, the movement of the designated body part 331 of the body 330 in the first video 341 may be the same as the movement of the designated body part 331 of the body 330 in the second video 342 each other. For example, in case that the designated body part 331 in the first video 341 moves up or down, the designated body part 331 of the body 330 in the second video 342 may also move up or down. In case that the designated body part 331 moves along the first axis d1, the processor of the electronic device 310 may obtain the first information and the second information without reflecting the extrinsic parameter of the plurality of cameras 320. As the extrinsic parameter is not reflected, in case that the designated body part 331 moves in a direction parallel to the first axis d1, the amount of calculation of the electronic device 310 for obtaining the first information and/or the second information may be reduced compared to the case where the designated body part 331 moves in a direction distinct from the first axis d1.

As described above, according to an embodiment, the electronic device 310 may obtain the first information and the second information for synchronizing the first video 341 and the second video 342 by identifying the movement of the designated body part 331 moving relatively with respect to the plurality of cameras 320.

Figure 5A:
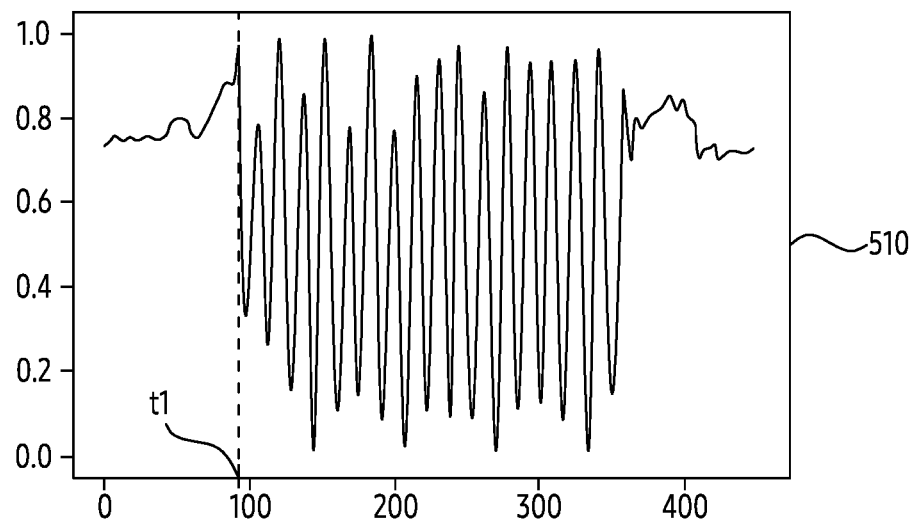
FIG. 5A is a graph illustrating an example of a movement of a designated body part indicated by first information and second information.
Figure 5A:
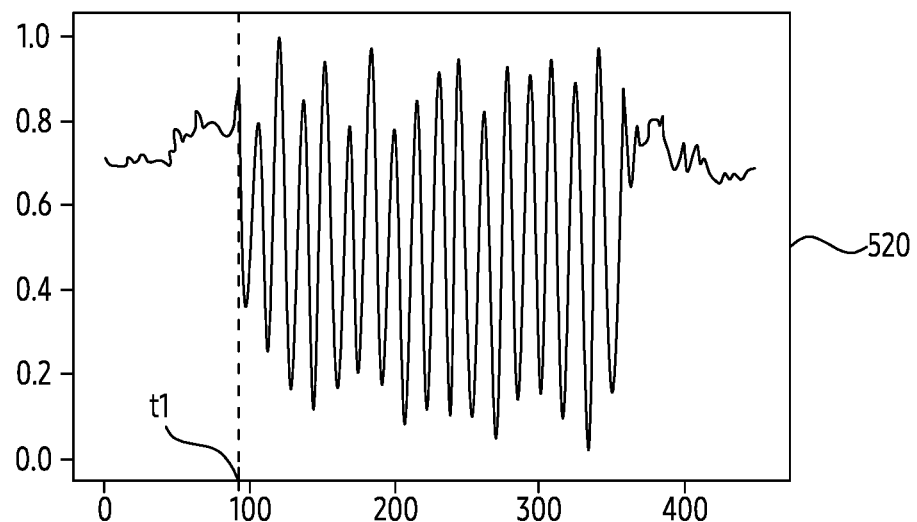
Figure 5B:
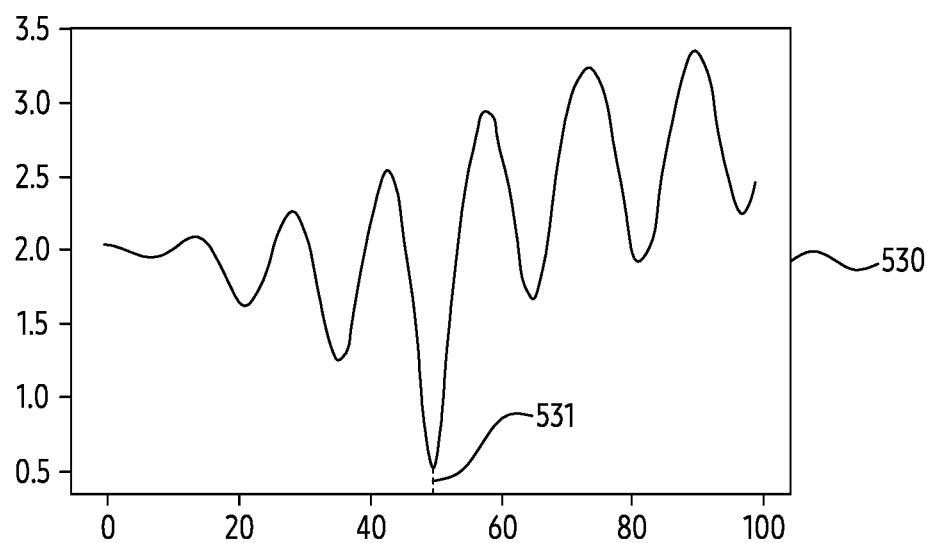
FIG. 5B illustrates an example of a method of identifying an offset for synchronizing a first video and a second video by an electronic device according to an embodiment.

FIG. 5A is a graph illustrating an example of a movement of a designated body part indicated by first information and second information, and FIG. 5B illustrates an example of a method of identifying an offset for synchronizing a first video and a second video by an electronic device according to an embodiment.

In FIG. 5A, a first graph 510 and a second graph 520 illustrate an example of a movement of a designated body part (e.g., a designated body part 331 of FIG. 4) indicated by the first information and the second information, respectively. In other words, the first graph 510 and the second graph 520 indicate a position change over time of a first point (e.g., a first point 341a of FIG. 4) and a second point (e.g., a second point 342a of FIG. 4) corresponding to the designated body part 331, respectively. In FIG. 5A, the horizontal axis of the first graph 510 and the second graph 520 indicate time, respectively, and the vertical axis indicates the normalized movement of the designated body part.

In FIG. 5B, the third graph 530 indicates the relationship between offset values for shifting the second graph 520 and absolute value of the difference between the second graph 520 shifted by a plurality of offsets and the first graph 510. In FIG. 5B the horizontal axis of the third graph 530 indicates the plurality of offset values for shifting the second graph 520, and the vertical axis of the third graph 530 indicates the absolute value of the difference between the second graph 520 shifted by the plurality of offsets and the first graph 510.

Referring to FIG. 5A, according to an embodiment, in a time domain of the second video (e.g., a second video 342 of FIG. 3), a processor of the electronic device (e.g., an electronic device 310 of FIG. 3) may identify the first offset 531 that minimizes the difference between the movement of the designated body part 331 in the first video (e.g., a first video 341 of FIG. 3) and the movement of the designated body part 331 in the second video 342, among offsets for shifting the second video 342. For example, due to a time difference between the first video 341 and the second video 342, the position of the first point 341a and the position of the second point 342a may be identified differently from each other at a first time point t1. The processor may shift the second graph 520 with the plurality of offsets in order to correct the time difference between the first video 341 and the second video 342.

Referring to FIG. 5B, according to an embodiment, the processor of the electronic device 310 may identify the first offset that minimizes the difference between the position of the first point 341a and the position over time of the second point 342a, among the plurality of offsets. For example, the processor may identify the offset 531 value in the third graph 530 having the smallest absolute value of the difference between the second graph 520 shifted with the plurality of offsets and the first graph 510, as the first offset.

According to an embodiment, the processor of the electronic device 310 may synchronize the first video 341 and the second video 342 based on identifying the first offset. The processor may record the synchronized first video 341 and the synchronized second video 342 in a memory of the electronic device 310.

According to an embodiment, the processor of the electronic device 310 may record data on the first offset in the memory of the electronic device 310 based on identifying the first offset. The recorded data on the first offset may be used when the electronic device 310 synchronizes the first video 341 and the second video 342 in order to obtain posture information of the body 330. According to an embodiment, the processor may store data on the first offset in meta data of a file corresponding to the second video 342, based on identifying the first offset.

According to an embodiment, the processor of the electronic device 310 may trim a part of the second video 342 based on identifying the first offset. For example, the processor may discard a part of the second video 342.

As described above, according to an embodiment, the electronic device 310 may synchronize the first video 341 and the second video 342 based on identifying the first offset that minimizes the difference between the movement of the designated body part 331 in the first video 341 and the movement of the designated body part 331 in the second video 342.

Meanwhile, in the above description, it has been described that the processor identifies the first offset among the offsets for shifting the second video 342 within the time domain of the second video 342, but is not limited thereto. For example, the processor may identify the first offset that minimizes the difference between the movement of the designated body part 331 in the first video 341 and the movement of the designated body part 331 in the second video 342, among offsets for shifting the first video 341 within the time domain of the first video 341. In case that the first offset is an offset for shifting the first video 341, the first offset may be stored in meta data of a file corresponding to the first video 341.

Meanwhile, the operation of the electronic device 310 described based on the first video 341 and the second video 342 in FIG. 5A and/or FIG. 5B may be applied substantially equally to the plurality of videos 340. For example, the processor of the electronic device 310 may identify a second offset that minimizes the difference between the movement of the designated body part 331 in the second video 342 and the movement of the designated body part 331 in the third video 343 among the offsets for shifting the third video 343, in the time domain of the third video 343, among the second video 342 and the third video 343. The processor may synchronize the second video 342 and the third video 343 based on identifying the second offset. The processor may record the identified second offset in meta data of a file corresponding to the third video 343. For another example, the processor of the electronic device 310 may identify a third offset that minimizes the difference between the movement of the designated body part 331 in the third video 343 and the movement of the designated body part 331 in the fourth video 344 among the offsets for shifting the fourth video 344, in the time domain of the fourth video 344, among the third video 343 and the fourth video 344. The processor may synchronize the third video 343 and the fourth video 344 based on identifying the third offset. The processor may record the identified third offset in meta data of a file corresponding to the fourth video 344.

Figure 6:
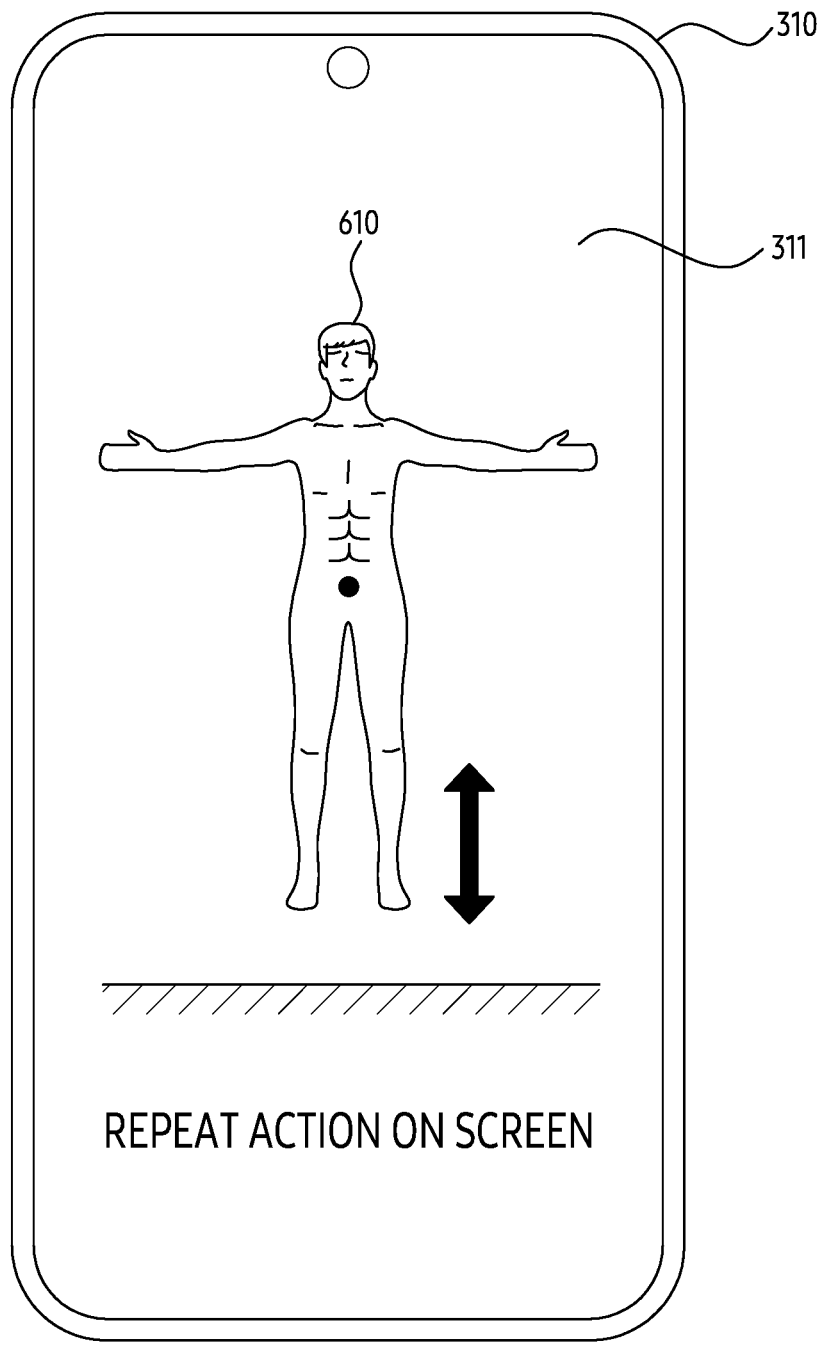
FIG. 6 illustrates an example of a notification provided by an electronic device to guide a movement of a designated body according to an embodiment.

FIG. 6 illustrates an example of a notification provided by an electronic device to guide a movement of a designated body according to an embodiment.

Referring to FIG. 6, a processor of an electronic device 310 may provide a notification for guiding the movement of the designated body part (e.g., a designated body part 331 of FIG. 4) before a body (e.g., a body 330 of FIG. 3) is captured by each of a plurality of cameras (e.g., a camera 320 of FIG. 3). According to an embodiment, the processor may provide a notification for guiding that the designated body part 331 is going to move in a direction (e.g., a first axis d1 of FIG. 3) parallel to the yaw axes (e.g., a yaw axis 320c of FIG. 3) of each of the plurality of cameras 320. For example, the processor may provide a notification for guiding that the designated body part 331 is going to move in a direction perpendicular to the ground. In case that the designated body part 331 does not move in a direction parallel to the yaw axis 320c, since an extrinsic parameter of the camera 320 must be reflected to obtain information for synchronizing a plurality of videos (e.g., a video 340 of FIG. 3), the amount of calculation of the electronic device 310 may increase compared to a case where the designated body part 331 moves in the direction parallel to the yaw axis 320c. According to an embodiment, the processor of the electronic device 310 may reduce the amount of calculation required to synchronize the plurality of videos 340 by providing a notification for guiding that the designated body part 331 is going to move in the direction parallel to the yaw axis 320c.

According to an embodiment, the processor of the electronic device 310 may provide a notification for continuing the movement of the designated body part 331 for a designated period of time. For example, the processor may provide a notification for continuing the movement of the designated body part 331 for more than 10 seconds, but is not limited thereto.

According to an embodiment, the processor may provide a visual notification through the display 311 of the electronic device 310. For example, the processor may display a visual object 610 for guiding the motion of the designated body part 331 through the display 311. The visual object 610 may have a shape corresponding to the shape of the body 330 and may display a motion of inducing the movement of the designated body part 331. For example, the notification provided by the visual object 610 may be provided in the form of an animation, but is not limited thereto. Through the motion represented by the visual object 610, the user may move the designated body part 331.

According to an embodiment, the processor of the electronic device 310 may provide an audible notification for guiding the motion of the designated body part 331. For example, the processor may provide a guide voice for guiding the start of the motion of the designated body part 331 and/or a guide voice for guiding the end of the motion of the designated body part 331. For another example, the processor may provide a guide voice that specifically guides the motion of the designated body part 331.

As described above, according to an embodiment, the electronic device 310 may obtain information for synchronizing the plurality of videos 340 by providing a notification for guiding the movement of the designated body part 331. According to an embodiment, the electronic device 310 may reduce the amount of calculation for synchronizing the plurality of videos 340 by inducing the movement of the designated body part 331 in the direction parallel to the yaw axis 320c of each of the plurality of cameras 320.

Figure 7:
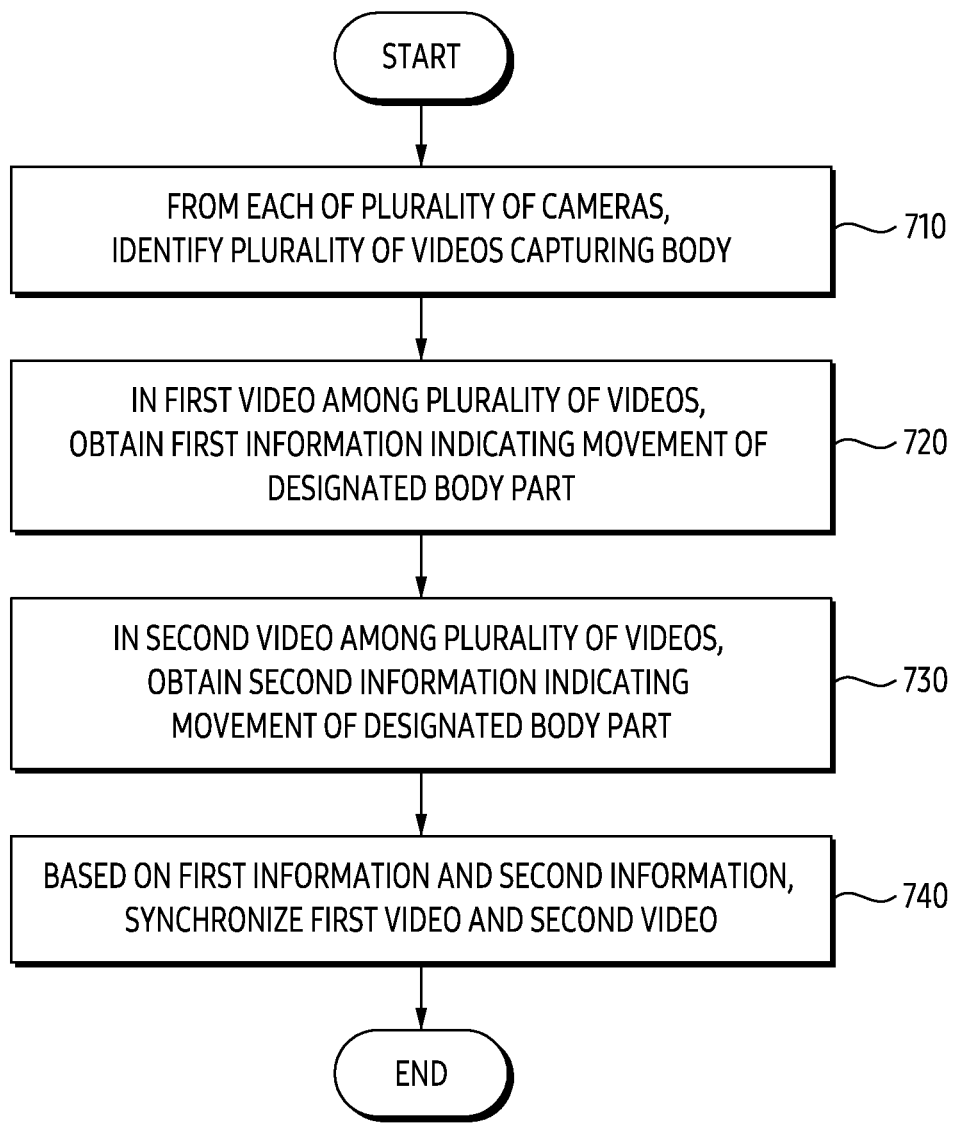
FIG. 7 is a flowchart for explaining an operation of an electronic device according to an embodiment.

FIG. 7 is a flowchart for explaining an operation of an electronic device according to an embodiment.

The operation illustrated in FIG. 7 may be performed by an electronic device 310 illustrated in FIG. 3.

Referring to FIG. 7, in operation 710, a processor of the electronic device 310 may identify a plurality of videos (e.g., a video 340 of FIG. 3) capturing a body (e.g., a body 330 of FIG. 3) from each of a plurality of cameras (e.g., a camera 320 of FIG. 3). According to an embodiment, a plurality of cameras 320 may orient the body 330 in an angle different from each other. For example, a first camera 321 may obtain a first video 341 having a first FoV by orienting the front surface of the body 330. For another example, a second camera 322 may obtain a second video 342 having a second FoV different from the first FoV by orienting the rear surface of the body 330. The first video 341 and the second video 342 may be obtained by the first camera 321 and the second camera 322 respectively and then may be transmitted to the electronic device 310. Within a plurality of videos 340, a designated body part (e.g., a designated body part 331 of FIG. 4) may move. For example, the designated body part 331 may move in a direction parallel to each of the yaw axes (e.g., a yaw axis 320c of FIG. 3) of the plurality of cameras 320.

In operation 720, the processor of the electronic device 310 may obtain first information indicating a movement of the designated body part 331 in the first video 341 among the plurality of videos 340. According to an embodiment, the processor may identify a first point (e.g., a first point 341a of FIG. 4) corresponding to the designated body part 331 based on a first model receiving the first video 341. Based on identifying the first point 341a, the processor may obtain the first information indicating a position change of the first point 341a over time. For example, the designated body part 331 may be a hip joint, but is not limited thereto.

In operation 730, the processor of the electronic device 310 may obtain second information indicating a movement of the designated body part 331 in the second video 342 among the plurality of videos 340. According to an embodiment, the processor may identify a second point 342a corresponding to the designated body part 331 based on a second model receiving the second video 342. Based on identifying the second point 342a, the processor may obtain the second information indicating a position change of the second point 342a over time. For example, the designated body part 331 may be the hip joint, but is not limited thereto.

In operation 740, the processor of the electronic device 310 may synchronize the first video 341 and the second video 342 based on the first information and the second information. According to an embodiment, the processor may identify a first offset that minimizes the difference between the movement of the designated body part 331 in the first video 341 and the movement of the designated body part 331 in the second video 342, among offsets for shifting the second video 342 in a time domain of the second video 342. According to an embodiment, the processor may synchronize the first video 341 and the second video 342 based on identifying the first offset.

As described above, the electronic device 310 according to an embodiment may synchronize the plurality of videos 340 based on identifying the movement of the designated body part 331 from each of the plurality of videos 340. According to an embodiment, the electronic device 310 may synchronize the plurality of videos 340 without preparing a time slate or a sensor, thereby providing convenience to a user who wants to obtain posture information of the body 330.

An electronic device (e.g., an electronic device 310 of FIG. 3) according to an embodiment may comprise a memory for storing instructions, and at least one processor operatively coupled to the memory, wherein when the instructions are executed, the at least one processor may be configured to identify a plurality of videos (e.g., a video 340 of FIG. 3) capturing a body (e.g., a body 330 of FIG. 3) from each of a plurality of cameras (e.g., a camera 320 of FIG. 3), obtain a first information indicating a movement of a designated body part (e.g., a designated body part 331 of FIG. 4) from a first video (e.g., a first video 341 of FIG. 3) of the plurality of videos, obtain a second information indicating a movement of the designated body part from a second video (e.g., a second video 342 of FIG. 3) of the plurality of videos, synchronize the first video and the second video based on the first information and the second information.

According to an embodiment, the movement of the designated body part may include a movement of the designated body part in a direction parallel to the yaw axes (e.g., the yaw axis 320c of FIG. 3) each of the plurality of cameras.

According to an embodiment, wherein when the instructions are executed, the processor may be configured to obtain the first information and the second information indicating a movement of the designated body part moving in a direction (e.g., a second axis d2 of FIG. 3) different from the yaw axes each of the plurality of cameras, based on a first data indicating a position relationship between the plurality of cameras.

According to an embodiment, the plurality of cameras may orient the body in a direction different from each other.

According to an embodiment, wherein when the instructions are executed, the processor may be configured to identify at least one first point (e.g., the first point 341a of FIG. 4) corresponding to the designated body part, based on a first model receiving the first video, and obtain the first information indicating the movement of the designated body part, based on identifying the movement of the at least one first point.

According to an embodiment, when the instructions are executed, the at least one processor may be configured to synchronize the first video and the second video, based on identifying a first offset minimizing a difference between the movement of the designated body part in the first video and the movement of the designated body part in the second video, among offsets for shifting the second video in a time domain of the second video.

According to an embodiment, when the instructions are executed, the at least one processor may be configured to trim a part of the second video, based on identifying the first offset.

According to an embodiment, when the instructions are executed, the at least one processor may be configured to store a data related to the first offset in a meta data of file corresponding to the second video, based on identifying the first offset.

According to an embodiment, when the instructions are executed, the at least one processor may be configured to store the synchronized first video and synchronized second video in the memory, based on synchronizing the first video and the second video.

According to an embodiment, when the instructions are executed, the at least one processor may be configured to provide an alarm (e.g., the visual object 610 of FIG. 6) guiding a movement of the designated body part before the body is captured by each of the plurality of cameras.

According to an embodiment, an operating method of an electronic device (e.g., the electronic device 310 of FIG. 3) may comprise identifying a plurality of videos (e.g., the video 340 of FIG. 3) capturing a body (e.g., the body 330 of FIG. 3) from each of a plurality of cameras (e.g., the camera 320 of FIG. 3), obtaining a first information indicating a movement of a designated body part (e.g., a designated body part 331 of FIG. 4) from a first video (e.g., the first video 341 of FIG. 3) of the plurality of videos, obtaining a second information indicating a movement of the designated body part from a second video (e.g., the second video 342 of FIG. 3) of the plurality of videos, and synchronizing the first video and the second video based on the first information and the second information.

According to an embodiment, the movement of the designated body part may include a movement of the designated body part in a direction parallel to the yaw axes (e.g., the yaw axis 320c of FIG. 3) each of the plurality of cameras.

According to an embodiment, the plurality of cameras may orient the body in a direction different from each other.

According to an embodiment, obtaining the first information may include identifying at least one first point (e.g., the first point 341a of FIG. 4) corresponding to the designated body part, based on a first model receiving the first video, and obtaining the first information indicating the movement of the designated body part, based on identifying the movement of the at least one first point.

According to an embodiment, synchronizing the first video and the second video may include synchronizing the first video and the second video, based on identifying a first offset minimizing a difference between the movement of the designated body part in the first video and the movement of the designated body part in the second video, among offsets for shifting the second video in a time domain of the second video.

According to an embodiment, the method may further include trimming a part of the second video, based on identifying the first offset.

According to an embodiment, the method may further include storing a data related to the first offset in a meta data of file corresponding to the second video, based on identifying the first offset.

According to an embodiment, a computer readable storage medium storing one or more programs, when executed by at least one processor of the electronic device (e.g., the electronic device 310 of FIG. 3), the one or more program may cause electronic device to identify a first video (e.g., the first video 341 of FIG. 3) capturing a body (e.g., the body 330 of FIG. 3) in a first FoV (Field-of-View) and a second video (e.g., the second video 342 of FIG. 3) capturing the body in a second FoV different from the first FoV, obtain an information for shifting at least one of the first video and the second video in a time domain, based on a movement of the body changing according to a designated axis (e.g., the first axis d1 of FIG. 4) included in the first FoV and the second FoV, synchronize the first video and the second video based on the obtained information and store the first video and the second video in a memory of the electronic device.

According to an embodiment, the designated axis may include a yaw axis (e.g., the yaw axis 320c of FIG. 3) of the first camera capturing the first video and a yaw axis (e.g., the yaw axis 320c of FIG. 3) of the second camera capturing the second video.

The electronic device according to various embodiments disclosed in the present document may be a device of various type. The electronic device may include, for example, a portable communication device (e.g., a smartphone), a computer device, a portable multimedia device, a portable medical device, a camera, a wearable device, a server, or a home appliance. The electronic device according to an embodiment of the present document is not limited to the above-described devices.

The various embodiments and terms used in the present document are not intended to limit the technical features described herein to specific embodiments and should be understood to include various modifications, equivalents, or substitutes of the embodiment. With respect to the description of the drawings, similar reference numerals may be used for similar or related components. The singular form of the noun corresponding to the item may include one or more of the items unless clearly indicated differently in a related context. In the present document, each of the phrases such as "A or B", "at least one of A and B", "at least one of A or B,", "A, B or C,", "at least one of A, B and C", and "at least one of A, B, or C" may include any one of the phrases together, or all possible combinations thereof. Terms such as "1st", "2nd", or "first", or "second" may be used simply to distinguish a corresponding component from another corresponding component, and are not limited to other aspects (e.g., importance or order). When some (e.g., the first) component is referred to as "coupled" or "connected" in another (e.g., the second) component, with or without the term "functional" or "communicatively", it means that some of the components may be connected directly (e.g., wired), wirelessly, or through a third component.

The term "module" used in the present document may include a unit implemented in hardware, software, or firmware and be used interchangeably with terms such as logic, logic block, component, or circuit, and the like, for example. The module may be a minimum unit or a part of the integrally configured component or the component that performs one or more functions. For example, according to an embodiment, the module may be implemented in the form of an application-specific integrated circuit (ASIC).

Various embodiments of the present document may be implemented as software (e.g., a program) including one or more instructions stored in a storage medium (or external memory) readable by a device (e.g., wearable device 100). For example, a processor (e.g., a processor) of a device (e.g., wearable device 100) may call and execute at least one of the one or more instructions stored from a storage medium. This makes it possible for the device to operate to perform at least one function according to the at least one command called. The one or more instructions may include code generated by a compiler or code that may be executed by an interpreter. The device-readable storage medium may be provided in the form of a non-transitory storage medium. Here, the term 'non-transitory' only means that a storage medium is a device that is tangible and does not include a signal (e.g., electromagnetic wave), and the term does not distinguish between a case where data is semi-permanently stored and a case where it is temporarily stored.

According to an embodiment, a method according to various embodiments disclosed in the present document may be provided by being included in a computer program product. The computer program products may be traded between sellers and buyers as products. The computer program products may be distributed in the form of device-readable storage media (e.g., compact disc read only memory (CD-ROM), or distributed (e.g., downloaded or uploaded) directly or online through an application store (e.g., Play Store™, or App Store™) or between two user devices (e.g., smartphones). In the case of online distribution, at least some of the computer program products may be temporarily stored or temporarily created on a device-readable storage medium such as a manufacturer's server, a server in an application store, or a memory in a relay server.

According to various embodiments, each of the above-described components (e.g., a module or a program) may include a single object or a plurality of objects. According to various embodiments, one or more components or operations of the above-described corresponding components may be omitted, or one or more other components or operations may be added. Alternatively, or additionally, a plurality of components (e.g., modules or programs) may be integrated into one component. In this case, the integrated component may perform one or more functions of component of each of the plurality of components in the same or similar manner as those performed by the corresponding component among the plurality of components before the integration. According to various embodiments, operations performed by a module, a program, or other components may be executed sequentially, in parallel, repeatedly, or heuristically, performed, one or more of the operations are executed in a different order, omitted, or one or more other operations may be added.

What is claimed is:

1. An electronic device comprising:
    a memory for storing instructions; and
    at least one processor operatively coupled to the memory;
    wherein when the instructions are executed, the at least one processor is configured to:
        identify a plurality of videos capturing a body taking a specified posture from each of a plurality of cameras,
        obtain first information indicating a movement of a designated body part caused by the specified posture taken by the body from a first video of the plurality of videos, the first information indicating the movement of the designated body part in a first direction parallel to a yaw axis of the first video by normalizing the movement of the designated body part in the first direction,
        obtain second information indicating the movement of the designated body part caused by the specified posture taken by the body from a second video of the plurality of videos, the second information indicating the movement of the designated body part in a second direction parallel to the yaw axis of the second video by normalizing the movement of the designated body part in the second direction, and
        synchronize the first video and the second video based on identifying a first offset minimizing a difference between the normalized movement of the designated body part in the first direction in the first video and the normalized movement of the designated body part in the second direction in the second video, among offsets for shifting the second video in a time domain of the second video.

2. The electronic device of claim 1, wherein the plurality of cameras respectively orient the body in a direction different from each other.

3. The electronic device of claim 1,
    wherein when the instructions are executed, the at least one processor is further configured to:
    identify at least one first point corresponding to the designated body part, based on a first model receiving the first video,
    obtain the first information indicating the movement of the designated body part, based on identifying the movement of the at least one first point.

4. The electronic device of claim 1,
    wherein when the instructions are executed, the at least one processor is further configured to:
    trim a part of the second video, based on identifying the first offset.

5. The electronic device of claim 1,
    when the instructions are executed, the at least one processor is further configured to:
    store data related to the first offset in meta data of file corresponding to the second video, based on identifying the first offset.

6. The electronic device of claim 1,
when the instructions are executed, the at least one processor is further configured to:
store the synchronized first video and synchronized second video in the memory, based on synchronizing the first video and the second video.

7. The electronic device of claim 1,
when the instructions are executed, the at least one processor is further configured to:
provide an alarm guiding the movement of the designated body part before the body is captured by each of the plurality of cameras.

8. A method of an electronic device comprising:
identifying a plurality of videos capturing a body taking a specified posture from each of a plurality of cameras;
obtaining first information indicating a movement of a designated body part caused by the specified posture taken by the body from a first video of the plurality of videos, the first information indicating the movement of the designated body part in a first direction parallel to a yaw axis of the first video by normalizing the movement of the designated body part in the first direction;
obtaining second information indicating the movement of the designated body part caused by the specified posture taken by the body from a second video of the plurality of videos, the second information indicating the movement of the designated body part in a second direction parallel to the yaw axis of the second video by normalizing the movement of the designated body part in the second direction; and
synchronizing the first video and the second video based on identifying a first offset minimizing a difference between the normalized movement of the designated body part in the first direction in the first video and the normalized movement of the designated body part in the second direction in the second video, among offsets for shifting the second video in a time domain of the second video.

9. The method of claim 8,
wherein obtaining the first information includes:
identifying at least one first point corresponding to the designated body part, based on a first model receiving the first video; and
obtaining the first information indicating the movement of the designated body part, based on identifying the movement of the at least one first point.

10. The method of claim 8,
wherein the method further includes:
trimming a part of the second video, based on identifying the first offset.

11. The method of claim 8,
wherein the method further includes:
storing data related to the first offset in meta data of file corresponding to the second video, based on identifying the first offset.

12. The method of claim 8, wherein the method further comprises storing the synchronized first video and synchronized second video in a memory of the electronic device, based on synchronizing the first video and the second video.

13. A non-transitory computer readable storage medium storing one or more programs, wherein when executed by at least one processor of an electronic device, the one or more programs cause the electronic device to:
identify a plurality of videos capturing a body taking a specified posture from each of a plurality of cameras,
obtain first information indicating a movement of a designated body part caused by the specified posture taken by the body from a first video of the plurality of videos, the first information indicating the movement of the designated body part in a first direction parallel to a yaw axis of the first video by normalizing the movement of the designated body part in the first direction,
obtain second information indicating the movement of the designated body part caused by the specified posture taken by the body from a second video of the plurality of videos, the second information indicating the movement of the designated body part in a second direction parallel to the yaw axis of the second video by normalizing the movement of the designated body part in the second direction, and
synchronize the first video and the second video based on identifying a first offset minimizing a difference between the normalized movement of the designated body part in the first direction in the first video and the normalized movement of the designated body part in the second direction in the second video, among offsets for shifting the second video in a time domain of the second video.

14. The non-transitory computer readable storage medium of claim 13, wherein when executed by the at least one processor of the electronic device, the one or more programs further cause the electronic device to:
identify at least one first point corresponding to the designated body part, based on a first model receiving the first video,
obtain the first information indicating the movement of the designated body part, based on identifying the movement of the at least one first point.

* * * * *